United States Patent
Bhattacharjee et al.

(10) Patent No.: US 6,322,722 B1
(45) Date of Patent: Nov. 27, 2001

(54) USE OF BO POLYOLS TO IMPROVE COMPATIBILITY OF PENTANE AND CYCLOPENTANE IN RIGID POLYURETHANE FOAMS

(75) Inventors: Debkumar Bhattacharjee, Lake Jackson; Dwight D. Latham, Clute, both of TX (US); Gilbert L. Nelson, Moscow, ID (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/304,738

(22) Filed: May 4, 1999

Related U.S. Application Data

(63) Continuation-in-part of application No. 08/994,465, filed on Dec. 19, 1997, now abandoned.
(60) Provisional application No. 60/032,449, filed on Dec. 19, 1996.
(51) Int. Cl.[7] .................................................. C09K 3/00
(52) U.S. Cl. ...................................... 252/182.24; 521/174
(58) Field of Search ...................... 521/174; 252/182.24

(56) References Cited

U.S. PATENT DOCUMENTS

| | | | |
|---|---|---|---|
| 3,072,582 | 1/1963 | Frost et al. | 265/2.5 |
| 3,153,002 | 10/1964 | Wismer et al. | 260/2.5 |
| 3,502,601 | 3/1970 | Case et al. | 521/172 |
| 3,884,849 * | 5/1975 | Molbert | 521/159 |
| 3,907,863 | 9/1975 | Voss . | |
| 3,978,011 * | 8/1976 | Molbert | 521/159 |
| 4,018,815 | 4/1977 | Vogt et al. . | |
| 4,521,547 | 6/1985 | Anderson | 521/137 |
| 4,761,433 | 8/1988 | Panchak et al. | 521/124 |
| 5,001,165 | 3/1991 | Canaday et al. | 521/131 |
| 5,169,877 | 12/1992 | Tucker et al. | 521/159 |
| 5,192,813 * | 3/1993 | Henn et al. | 521/159 |
| 5,494,941 * | 2/1996 | Lutter et al. | 521/159 |
| 5,525,641 | 6/1996 | White, III et al. | 521/131 |
| 5,525,702 | 6/1996 | Nace | 528/354 |
| 5,547,998 | 8/1996 | White et al. | 521/131 |

FOREIGN PATENT DOCUMENTS 9-143240    6/1997   (JP) .............................. C08G/18/48

OTHER PUBLICATIONS

Chemical Abstract No. 34515.

\* cited by examiner

*Primary Examiner*—Morton Foelak

(57) ABSTRACT

The present invention is a polyol mixture that is useful for preparing polyurethane and polyisocyanurate foams. The polyol mixture of the present invention includes: a polyol that is derived from butylene oxide; and a hydrocarbon blowing agent such as pentane or cyclopentane, for example. Use of butylene oxide polyols of the present invention allow inclusion of a sufficient amount of a hydrocarbon blowing agent to produce foams having low density, without incorporating a higher concentration of water into a polyurethane foam formulation.

11 Claims, No Drawings

USE OF BO POLYOLS TO IMPROVE COMPATIBILITY OF PENTANE AND CYCLOPENTANE IN RIGID POLYURETHANE FOAMS

CROSS-REFERENCE TO RELATED APPLICATIONS

This application is a Continuation-In-Part of copending application Ser. No. 08/994,465, filed on Dec. 19, 1997, abandoned which claims the benefit of U.S. Provisional Application Ser. No. 60/032,449, filed on Dec. 19, 1996 (now abandoned).

BACKGROUND OF THE INVENTION

Polyether polyols can be used in the preparation of polyurethane and polyisocyanurate foams (foams), and are typically prepared from propylene oxide and/or ethylene oxide, using initiators such as sucrose, sorbitol, or glycerol, for example. Polyurethane foams prepared from polyether polyols are used in a variety of applications, including construction, appliance, automotive, and carpet applications. Rigid foams, in particular, are used in appliance and construction applications, for example. A polyol mixture used to prepare polyurethane foam formulations can include a blowing agent, in addition to other components. Blowing agents can be used to create cellular structures within a foam. Some conventional blowing agents, such as halogenated hydrocarbons, for example, can be perceived as harmful to the environment.

Non-halogenated hydrocarbon blowing agents, that is, hydrocarbon blowing agents (HCBAs) are important alternatives to traditional halogenated hydrocarbon blowing agents. Hydrocarbons such as pentane and cyclopentane have been used successfully as blowing agents in polyurethane systems, and are not believed to harm the ozone layer of the atmosphere. The use of hydrocarbons as blowing agents is demonstrated in, for example, U.S. Pat. No. 3,072,582. The use of hydrocarbon blowing agents can present problems, however.

Insolubility of hydrocarbon blowing agents in polymer formulations can lead to processing problems, particularly in producing polyurethane and polyisocyanurate foam products, for example. The possibility of phase separation of HCBAs from a foam formulation makes it necessary to take measures to maintain a homogeneous mixture or dispersion when HCBAs are used. One way of using HCBAs in conventional polyol mixtures can be to limit the amount of HCBA included in a polyol mixture to a low concentration, in order to avoid separation of the HCBA from the mixture. While separation of the HCBA can be avoided, the amount of blowing agent actually included in a polyurethane foam formulation can be an important factor in determining the quality of a polyurethane foam product. Having too low a concentration of blowing agent in a foam formulation can detrimentally affect the quality of a foam. For example, using too little blowing agent can cause the density of the foam to be too high. To prepare a low density foam, that is, a foam having a density of less than 2.5 lbs per cubic foot (pcf), it can be necessary to include more water than would otherwise be desirable when using conventional blowing agents. Increasing the amount of water in a foam formulation can detrimentally affect the 15 dimensional stability and long-term thermal conductivity of a foam due to the relatively fast rate of diffusion of carbon dioxide from a foam, compared with a hydrocarbon or halogenated hydrocarbon blowing agent.

HCBAs such as pentane and cyclopentane can be particularly incompatible with polyols substantially prepared using ethylene oxide and/or propylene oxide. Aromatic polyester polyols can incorporate only a limited amount of HCBAs. Surfactants can aid in making the components of a polyol mixture compatible, but are not completely helpful in making HCBAs compatible in a polyol mixture.

It would be desirable in the art of preparing polyurethane foams to utilize hydrocarbon blowing agents in a polyurethane foam formulation. It would also be desirable in the art of preparing polyurethane foams to make a low density foam from a polyurethane foam formulation that includes hydrocarbon blowing agents but does not require additional water in the formulation. Finally, it would be desirable in the art of preparing polyurethane foams to include hydrocarbon blowing agents in a foam formulation at a concentration that will yield a low density foam, wherein the hydrocarbon blowing agent does not phase separate from the formulation.

SUMMARY OF THE INVENTION

In one aspect, the present invention is a polyol mixture comprising: a polyol substantially derived from butylene oxide, and at least one HCBA, wherein solubility of the HCBA in the polyol is increased by at least about 30% over HCBA solubility in a polyol not substantially derived from butylene oxide.

In another aspect, the present invention is a foam prepared from a polyol mixture wherein the polyol mixture comprises: a polyol substantially derived from butylene oxide, and at least one HCBA, wherein solubility of the HCBA in the polyol is increased by at least about 30% over HCBA solubility in a polyol not substantially derived from butylene oxide.

In still another aspect, the present invention is a process for preparing a foam comprising the steps: (1) forming a reactive mixture by admixing a polyisocyanate with a polyol mixture, wherein the polyol mixture comprises: a polyol derived substantially from butylene oxide; a catalyst; a surfactant, and at least one HCBA, wherein solubility of the HCBA in the polyol is increased by at least about 30% over HCBA solubility in a polyol not substantially derived from butylene oxide; (2) pouring the reactive mixture into a mold; (3) allowing the reactive mixture to cure to a tack-free foam; and (4) optionally removing the foam from the mold.

DESCRIPTION OF THE PREFERRED EMBODIMENTS

In one embodiment, the present invention is a polyol mixture useful for preparing polyurethane and polyisocyanurate foams. Hereinafter, it is to be understood that for the purposes of the present invention, "polyurethane" can refer to both polyurethane polymers as well as to polyisocyanurate polymers. A polyol mixture of the present invention includes a polyol and at least one HCBA, together with optional components. Polyols useful in the practice of the present invention are polyether polyols substantially derived from 1,2-butylene oxide(butylene oxide), including aliphatic and aromatic polyether polyols. For example, Bisphenol-A can be modified to obtain a polyol that is useful in the practice of the present invention. Polyols of the present invention can be prepared exclusively from butylene oxide monomer, or from mixtures of butylene oxide with other oxide monomers. For example, polyether polyols of the present invention can be prepared from a combination of butylene oxide and alkylene oxides having 2 to 4 carbon atoms, such as ethylene oxide, propylene oxide, and 2,3-butylene oxide. A polyol of the present invention is substantially derived from butylene oxide if it includes at least about 25 percent by weight butylene oxide. Preferably, a polyol of the present invention is substantially derived from butylene oxide if it includes at least about 50 percent, more preferably at least about 70 percent, and most preferably at least about 80 percent by weight of the polyol is derived from butylene oxide. Polyols substantially derived from butylene oxide (BO polyols) can be reacted with isocyanate groups under conditions suitable for preparing a polyurethane.

Polyols of the present invention can be prepared by methods known and practiced in the art of preparing polyether polyols. Such methods are described, for example, in U.S. Pat. No. 3,153,002. Generally, a polyol of the present invention can be prepared by reacting butylene oxide and an initiator in the presence of a catalyst. The ratio of initiator to alkylene oxide can be any ratio that is effective for making polyols suitable for use in the present invention, and will depend on the targeted molecular weight and functionality of the base polyol. The catalyst can be alkaline or acidic. Polyols of the present invention can be prepared, for example, by combining butylene oxide, with an initiator such as ethylene glycol or propylene glycol, in the presence of a catalyst.

Catalysts suitable for use in the practice of the present invention include, for example, amine compounds such as dimethylcyclohexylamine, dimethylethanolamine, and diethylethanolamine, like compounds, and mixtures thereof; Group I and Group II metal hydroxides such as sodium hydroxide, potassium hydroxide, calcium hydroxide, barium hydroxide, lithium hydroxide, like compounds and mixtures thereof. Particularly preferred are: potassium hydroxide, trimethylamine, and dimethylcyclohexylamine.

The catalyst can be present in an amount from about 1 percent to about 10 percent, preferably from about 2 percent to about 8 percent, more preferably from about 2 percent to about 6 percent based on the weight of the initiator. Elevated temperature can advantageously be employed to effect the polymerization. A suitable temperature can be any temperature above 100° C. Preferably the temperature range is from about 100° C. to about 135° C. More preferably the temperature range is from about 110° C. to about 130° C. Most preferably the temperature range is from about 120° C. to about 130° C.

Examples of initiators useful in the practice of the present invention include active hydrogen containing compounds. Active hydrogen containing compounds are compounds having functionality wherein at least one hydrogen atom is bonded to an electronegative atom such as sulfur, nitrogen, or oxygen. Active hydrogen containing compounds useful herein can contain any combination of hydroxyl, amino, and mercaptyl functionality. Examples of such materials include those selected from the following classes of compositions, alone or in admixture: (a) polyhydroxyalkanes; (b) non-reducing sugars and sugar derivatives; (c) polyphenols; and amines. Examples of polyhydroxyalkanes useful herein include ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, manitol, like compounds and mixtures thereof. Examples of sugars and sugar derivatives useful as initiators in the practice of the present invention include sucrose; fructose; mannose; galactose; glucose; like compounds and mixtures thereof. Alkyl and aryl ethers having at least one active hydrogen, and alkylene oxide adducts of sugars are also useful herein. Compounds derived from phenols such as bisphenols such as 2,2-(4,4'-hydroxyphenyl)propane; alkylphenols such as dodecylphenol, octylphenol, decylphenol; and polyphenols derived from condensation of formaldehyde with phenols, like compounds and mixtures thereof are also suitable for forming the polyols useful in the practice of the present invention. Particularly preferred initiators are polyhydroxy compounds such as glycerol, sugars such as sucrose, like compounds and mixtures thereof.

Polyols of the present invention can be prepared from alkylene oxides and an amine initiator or mixture of amine initiators. Aliphatic amines can be suitable for use as an initiators in the practice of the present invention and include, for example, ethylenediamine, ethanolamine, diethylenetriamine, aminoethylethanolamine, like compounds and mixtures thereof. Aromatic amine s can also be suitable for preparing a polyol of the present invention can include any di-, or poly-functional aromatic amine. Suitable aromatic amines include: the isomers of toluene diamine (TDA), which include 2,6-TDA, and 2,4-TDA, for example; isomers of methylene diamine (MDA) which include, for example, 2,2'-MDA, 2,4'-MDA, and 4,4'-MDA; oligomers of MDA which include, for example, mixtures of isomeric compounds having from 3 to 6 aromatic rings; alkyl derivatives of aromatic amines such as 4-methyl-2,6-TDA and isomers of dimethyl-MDA; halogentated derivatives of TDA such as 3-chloro-2,4,-TDA; like compounds and mixtures of any of these.

Polyols of the present invention can have a molecular weight in the range of from about 200 to about 3500. Preferably, the molecular weight of a polyol of the present invention is in the range of from about 250 to about 2500. More preferably, the molecular weight is from about 250 to about 2000, most preferably from about 250 to about 1500.

The functionality of the polyols of the present invention can be greater than about 2.0. Preferably the functionality is from about 2.5 to about 7.5. More preferably from about 3 to about 7.5, most preferably from about 3.1 to about 7.

Blowing agents of the present invention include non-halogenated hydrocarbons having 2 to 8 carbon atoms. Suitable hydrocarbon blowing agents include the saturated isomers and the unsaturated isomers of: ethane; propane; butane; pentane; hexane; heptane; and, octane. For example, n-butane, isobutane, pentane, isopentane, 2-methyl pentane, and 2,2-dimethylpentane, like compounds, and mixtures thereof, are suitable for use herein. Cyclic hydrocarbon blowing agents are useful in the practice of the present invention. For example, cyclopropane, cyclobutane, cyclopentane, cyclohexane, cycloheptane and cyclooctane, cyclopentene, cyclohexene, cyclohexadiene, cyclopentadiene, methylcyclohexane, like compounds, and mixtures thereof, can be used in the invention described herein. Oxygenated hydrocarbons are also useful as blowing agents, in the practice of the present invention. Examples of oxygenated blowing agents include alkyl ethers having from 2 to 12 carbon atoms. Suitable alkyl ethers include, for example, dimethyl ether; diethyl ether; ethyl, methyl ether; diiusopropyl ether; ethyl, isopropyl ether; like compounds, and mixtures thereof. Preferred blowing agents are butane, isobutane, pentane, isopentane, and cyclopentane.

Blowing agents of the present invention can be combined with a polyol in any proportion that can yield a polyol mixture having a homogeneous single phase. By "homogeneous single phase mixture", it is meant that the polyol mixture does not separate into two distinct phases or layers. The polyol mixture is a stable mixture in that the blowing agent does not separate from the polyol within a 2 to 7-day period. A polyol mixture of the present invention can include any amount of HCBA that is effective in producing a low density polyurethane foam. A polyol mixture of the present invention can include at least about 8 parts per hundred parts of polyol. Preferably, a polyol mixture of the present invention can include at least about 12 parts, more preferably at least about 14 parts, and most preferably at least about 15 parts per hundred parts of polyol.

The solubility of a HCBA is increased in a polyol that is substantially derived from butylene oxide relative to the solubility of a HCBA in a comparable polyol that is not substantially derived from butylene oxide, such as a propylene oxide derived polyol. For the purposes of the present invention, comparable polyols are polyols that have similar equivalent weights and functionality. The equivalent weight and functionality of a polyol can be determined by methods known and practiced by those skilled in the art of preparing polyols. In the present invention, the solubility of a HCBA in a polyol substantially derived from butylene oxide can be increased by at least about 30%. Preferably the solubility is increased by at least about 45%, more preferably by at least about 50%. Even more preferably the solubility is increased by at least about 75%, and most preferably by at least about 100%

When used in the preparation of a polyurethane foam, the polyol substantially derived from butylene oxide containing the HCBA can be blended with other polyols. Such a blend enhances that amount of HCBA than can be present in the polyol blend over a blend which does not contain a polyol substantially derived from butylene oxide.

Alternatively, a portion of a blowing agent can be included in an isocyanate ("A" side) component of a polyurethane-forming mixture. From about 0 percent to about 100 percent of the blowing agent can be included in the isocyanate. Preferably, from about 0 percent to about 75 percent of the blowing agent is included in the isocyanate. More preferably from about 0 percent to about 50 percent, and most preferably from about 0 to about 25 percent of the blowing agent is included in the isocyanate.

A formulated polyol blend used in a polyurethane-forming mixture of the present invention can include optional components. The polyol blend of the present invention can include, for example, polyurethane catalysts, surfactants, flame retardants, water, fillers, pigments, and cross-linkers.

Examples of polyurethane catalysts suitable for preparing a polyurethane foam of the present invention are tertiary amine catalysts such as: triethylenediamine; N-methyl morpholine; dimethylethanolamine; pentamethyldimethylenetriamine; N-ethyl morpholine; diethylethanolamine; N-coco morpholine; 1-methyl-4-dimethylaminoethyl piperazine; bis(N,N-dimethylaminoethyl)ether; similar compounds, and mixtures of any of these.

Suitable catalysts for use with the present invention also include those which catalyze the formation of isocyanurates such as those mentioned in Saunders and Frisch, *Polyurethanes, Chemistry and Technology* in *High Polymers* Vol. XVI, pp. 94–97 (1962). Such catalysts are referred to as trimerization catalysts. Examples of these catalysts include aliphatic and aromatic tertiary amine compounds, organometallic compounds, alkali metal salts of carboxylic acids, phenols and symmetrical triazine derivatives. Preferred catalysts are potassium salts of carboxylic acids such as potassium octoate and the potassium salt of 2-ethylhexanoic acid and tertiary amines such as, for instance, 2,4,6-tris(dimethyl aminomethyl) phenol.

Amine catalysts are usually used in an amount of from about 0.1 to about 5, preferably from about 0.2 to about 3 parts per 100 parts of polyol composition, by weight. Organometallic catalysts are also suitable, and examples include organolead, organoiron, organomercury, organobismuth, and preferably organotin compounds. Most preferred are organotin compounds such as dibutyltin dilaurate, dimethyltin dilaurate, stannous octoate, stannous chloride and similar compounds. Organometallic compounds are usually used in an amount from about 0.05 to about 0.2 parts per 100 parts, by weight, of polyol composition.

Examples of surfactants that can be optionally included are silicone surfactants, most of which are block copolymers containing at least one polyoxyalkylene segment and one poly(dimethylsiloxane) segment. Other surfactants include polyethylene glycol ethers of long chain alcohols, tertiary amine or alkanolamine salts of long chain alkyl sulfate esters, alkyl sulfonic esters and alkylaryl sulfonic acids. Surfactants prepared from ethylene oxide and butylene oxide, as described in U.S. appl. Ser. No. 08/342,299 U.S. Pat. No. 5,600,019 (allowed Jul. 23, 1996), are also useful in the practice of the present invention. A surfactant can be optionally included in the polyol formulation or in a polyisocyanate composition. When used, about 0.1 to about 3, preferably about 0.2 to about 2.5 part by weight of surfactant to 100 parts of polyol by weight is normally adequate.

Examples of crosslinkers are diethanolamine and methylene bis(ochloroaniline), similar compounds and mixtures thereof. The use of cell openers, mold release agents, flame retardants, fillers, and other additives are known in the art to modify the properties and aid in the processability of the foam.

In still another embodiment, the present invention is a polyurethane-forming mixture that is prepared from the combination of an isocyanate mixture and a formulated polyol blend. The terms "isocyanate" and "polyisocyanate" are used interchangeably herein, with the caveat that isocyanate compounds useful in the practice of the present invention contain at least two isocyanate moieties per molecule. Polyisocyanates used in the present invention are not unique. Any isocyanate known and used in the art of preparing polyurethane polymers is suitable for the practice of the present invention.

Useful isocyanates are described in U.S. Pat. No. 4,785,027, for example. Examples of suitable isocyanates include: the isomers of toluene diisocyanate (TDI) such as 2,4-toluene diisocyanate and 2,6-toluene diisocyanate; prepolymers of TDI, wherein prepolymers of TDI are compounds known in the art to be useful in preparing polyurethane foams; oligomeric mixtures of MDI, wherein the mixture includes MDI and oligomers of MDI having 3 or more aromatic rings; bis(4-isocyanatophenyl)methane (MDI); prepolymers of MDI, wherein prepolymers of MDI are compounds known in the art to be useful in preparing polyurethane foams; oligomeric mixtures of MDI; bis(isocyanatoethyl fumerate); dianisidine diisocyanate; toluidine diisocyanate; 1,6-hexamethylene diisocyanate; and mixtures of at least any two suitable compounds of this type. Preferred are TDI, MDI, prepolymers of TDI, prepolymers of MDI, oligomeric mixtures of MDI, or such mixtures of any of these.

In another embodiment, the present invention is a polyurethane foam prepared using the polyether polyols of the present invention. A polyurethane foam of the present invention can be prepared by conventional methods, the improvement being the use of the BO polyols and a HCBA to prepare the foams. In general, a polyurethane foam of the present invention can be prepared by reacting a polyol formulation with an isocyanate mixture. A polyurethane-forming reactive mixture can be poured into a mold, or alternatively processed either by injection molding or reaction injection molding (RIM). Injection molding and RIM are described, in *Macromolecules*-2, Hans-Georg Elias ed., (2nd ed., 1984). Foams of the present invention can be prepared by block-foam, double-band lamination, discontinuous panel, or pour-in-place processes. Each process is well known in the art of preparing polyurethane foams. Polyurethane foams prepared according to the present invention can be useful in construction appliance, automotive, and carpet applications.

EXAMPLES

The following examples and comparative example are meant to be illustrative of the present invention. These examples and comparative example are not intended to limit the scope of the claims of the present invention and they should not be interpreted in that manner.

Example 1

108 pounds of butylene oxide is added, with stirring, at a rate of 0.1 lb/min to a slurry composed of 28.73 lbs of sucrose, 22.5 lbs of glycerol, and 1.2 lbs of dimethylethanolamine. The addition is carried out at 120° C. The polyol mixture is stirred at 120° C. for an additional 4 hours after all of the butylene oxide is added. The polyol has a viscosity of 1735 centistokes at 100°F., and a percent hydroxyl (%OH) of 14.95. The hydroxyl equivalent weight (eq. wt.) is 114.

Example 2

The solubility of n-pentane and cyclopentane (c-pentane) in a polyol sample is determined by first measuring from between 50 to 100 grams of the polyol into a 4 oz container. The samples are conventional propylene oxide based polyols and their BO-based analogs. The BO-based polyols have the same equivalent weight as the PO-based analog. The hydrocarbon solute is added to the polyol sample. The container is capped to prevent the loss of blowing agent and then slowly heated until a clear solution is obtained. The container is allowed to cool to room temperature, and the appearance of a cloudy mixture is indication that the solubility of the solute is exceeded in that sample. If the solution remains clear, additional solute is added and the procedure repeated until a cloudy mixture is obtained. In this test a cloudy mixture is taken as indication that the polyol will separate into two layers in less than two days. The solubility reported in Table 1 is the highest concentration of solute, in parts per hundred parts (parts) based on the weight of the polyol, that yields a clear solution after the sample cools to room temperature.

TABLE 1

| Polyol Type | n-Pentane Solubility (parts) | | c-Pentane Solubility (parts) | |
| --- | --- | --- | --- | --- |
| | PO polyol* | BO Polyol | PO polyol* | BO polyol |
| V-225 | 4 | 8 | 12 | 33 |
| V-490 | 5 | 10 | 17 | 36 |
| V-390 | 8 | 12 | 28 | 50 |
| V-360 | 7 | 20 | 33 | 56 |
| V-280 | 7 | 15 | 23 | 41 |
| V-270 | 33 | complete[a] | complete[a] | complete[a] |

*Not an example of the present invention.
[a]Completely soluble in all proportions.
V-225 is a polyol initiated with glycerol and reacted with oxide monomer up to an average molecular weight of 250 and a hydroxyl number of 673.
V-490 is a polyol initiated with sucrose/glycerol and reacted with oxide monomer up to an average molecular weight of 460 and a hydroxyl number of 490.
V-390 is a polyol initiated with toluene diamine and reacted with oxide monomer up to an average molecular weight of 575 and a hydroxyl number of 390.
V-360 is a polyol initiated with sucrose/glycerol and reacted with oxide monomer up to an average molecular weight of 728 and a hydroxyl number of 360.
V-280 is a polyol initiated with sucrose/glycerol and reacted with oxide monomer up to an average molecular weight of 1382 and a hydroxyl number of 280.
V-270 is a polyol initiated with glycerol and reacted with oxide monomer up to an average molecular weight of 700 and a hydroxyl number of 235.

Example 3

A polyol blend is prepared by admixing 85 parts of Terate™ 2541 (available from Cape Industries) and 15 parts of the BO polyol prepared in Example 1, 2.5 parts of EP-250™ (available from Goldschmidt Chemical Corp.), 2.2 parts of DABCO™ K-15 (available from Air Products), 0.6 parts of Pelron™ 9650 (available from Pelron Corp.), 0.5 parts of Polycat™5 (available from Air Products), and 0.5 parts water. To this blend is added 21.6 parts of cyclopentane. The mixture is stirred until a homogeneous blend is obtained. To this blend is added 229.2 parts of PAPI® 580 (Trademark of the Dow Chemical Co.), and the resulting reactive mixture is immediately mixed for 10 seconds using a high speed mixer. The mixture is poured into a cup and allowed to expand to form a rigid foam.

Example 4

A polyol blend is prepared by mixing: 75 parts of Voranol® 490 (Trade designation of the Dow Chemical Co., eq. wt. 114); 12.5 parts of Voranol® 800 (Trade designation of the Dow Chemical Co.); 12.0 parts of methyldiethanolamine; 0.5 parts of aminoethylethanolamine; 1.5 parts of Polycat™ 5; 1.0 part of TMR™ 5 (available from Air Products); 1.0 part of Toyocat™ MR (available from Tosoh, Inc.); 3.0 parts of Dabco™ DC 5357 (available from Air Products); 1.59 parts of water; and 18.5 parts of cyclopentane. To this blend is added 198.8 parts of PAPI® 27 and the mixture is mixed immediately with a high speed mixer. The mixture is poured into a 9"×2"×16" mold which is heated to 50° C., and the mixture allowed to expand to form a rigid foam. A sample of the polyol blend used to make this foam separated on standing within 24 hours.

The foam is tested for compressive strength (X, Y), core density, dimensional stability (freeze (−30°) and humid age (158° C.), and K-factor. Compressive strength is determined according to ASTM D-1621. Dimensional stability is determined according to ASTM D-2126, and the data reported in Table 2 are after 28 days. K-factor is determined according to ASTM C 518-85. Core density is determined according to ASTM D-1622. The foam properties are reported in Table 2.

Example 5

The procedure of Example 4 was repeated. The physical properties of the foam are reported in Table 2.

Example 6

The procedure of Example 4 was repeated. The physical properties of the foam are reported in Table 2.

Example 7

The procedure of Example 4 was repeated, except that 75 parts of the BO polyol described in Example 1 is used. The sample of the polyol blend used to make this foam did not separate on standing within 7 days. The physical properties of the foam are reported in Table 2.

Example 8

The procedure of Example 7 is repeated. The physical properties of the foam are reported in Table 2.

Example 9

The procedure of Example 7 is repeated. The physical properties of the foam are reported in Table 2.

TABLE 2

| Ex. No. | Comp. Strgth (X) | Comp. Strgth (Y) | Core Density | Dim. Stability (A/B) (−30° C.) | Dim. Stability (A/B) (158° C.) | K-factor |
|---|---|---|---|---|---|---|
| 4* | 9.7 | 26.9 | 1.54 | −2.22/−1.44 | 10.34/11.26 | 0.130 |
| 5* | 9.2 | 32.5 | 1.54 | −2.78/−4.84 | 10.30/9.75 | 0.130 |
| 6* | 10.9 | 38.0 | 1.67 | −0.89/−2.20 | 7.05/7.68 | 0.132 |
| 7 | 8.6 | 29.9 | 1.54 | −8.68/−8.17 | 15.34/10.86 | 0.132 |
| 8 | 9.8 | 32.5 | 1.57 | −2.06/−2.76 | 9.02/9.56 | 0.133 |
| 9 | 10.3 | 36.3 | 1.63 | −0.94/−1.79 | 8.99/8.41 | 0.133 |

*Not an example of the present invention.

What is claimed is:

1. A polyol mixture useful for preparing polyurethane foams comprising:
    (a) a polyol; and
    (b) at least one hydrocarbon blowing agent (HCBA), wherein the polyol is at least 25 percent, by weight, derived from butylene oxide, the amount of HCBA present in the polyol mixture is at least about 30% greater than the maximum soluble amount of HCBA in an analogous polyol derived substantial from propylene oxide, the HCBA and the polyol form a homogeneous single-phase mixture and the HCBA is selected from the group of cyclic, acyclic, saturated and unsaturated compounds having from 4 to 6 carbon atoms.

2. The polyol mixture of claim 1 wherein the polyol is at least about 50 percent, by weight, derived from butylene oxide.

3. The polyol mixture of claim 2 wherein the polyol is at least about 70 percent, by weight, derived from butylene oxide.

4. The polyol mixture of claim 3 wherein the polyol is at least about 80 percent, by weight, derived from butylene oxide.

5. The polyol mixture of claim 1 wherein the amount of the HCBA in the polyol mixture is at least about 45% greater than the maximum soluble amount of HCBA in an analogous polyol derived substantially from propylene oxide.

6. The polyol mixture of claim 5 wherein the amount of the HCBA in the polyol mixture is at least about 50% greater than the maximum soluble amount of HCBA in an analogous polyol derived substantially from propylene oxide.

7. The polyol mixture of claim 6 wherein the amount of the HCBA in the polyol mixture is at least about 45% greater than the maximum soluble amount of HCBA in an analogous polyol derived substantially from propylene oxide.

8. The polyol mixture of claim 1 wherein the amount of the HCBA in the polyol mixture is at least about 45% greater than the maximum soluble amount of HCBA in an analogous polyol derived substantially from propylene oxide.

9. The polyol mixture of claim 1 wherein the HCBA is selected from the group consisting of butane, isobutane, pentane, cyclopentane, and isopentane, or mixtures thereof.

10. The polyol mixture of claim 1 wherein the HCBA is cyclopentane.

11. The polyol mixture of claim 1 wherein the HCBA is isopentane, n-pentane, or mixtures thereof.

* * * * *